(12) United States Patent
Ida

(10) Patent No.: US 8,031,862 B2
(45) Date of Patent: *Oct. 4, 2011

(54) VOICE MAIL APPARATUS AND CONTROL METHOD THEREOF

(75) Inventor: Hiroki Ida, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1245 days.

This patent is subject to a terminal disclaimer.

(21) Appl. No.: 11/641,822

(22) Filed: Dec. 20, 2006

(65) Prior Publication Data

US 2007/0153988 A1 Jul. 5, 2007

(30) Foreign Application Priority Data

Dec. 21, 2005 (JP) .............................. P 2005-368223

(51) Int. Cl.
 *H04M 1/00* (2006.01)
 *H04M 1/64* (2006.01)
 *H04B 1/06* (2006.01)

(52) U.S. Cl. ...................... 379/390.03; 379/68; 455/355

(58) Field of Classification Search .................. 379/347, 379/388.03, 390.03, 88.07; 455/127.2, 355
See application file for complete search history.

(56) References Cited

U.S. PATENT DOCUMENTS

| | | | |
|---|---|---|---|
| 6,654,594 B1 * | 11/2003 | Hughes et al. | 455/245.1 |
| 7,233,659 B1 * | 6/2007 | Davis et al. | 379/388.03 |
| 2003/0021394 A1 * | 1/2003 | Krack | 379/88.01 |
| 2005/0049735 A1 * | 3/2005 | Kim et al. | 700/94 |
| 2005/0123128 A1 * | 6/2005 | Ellison | 379/390.03 |
| 2006/0106472 A1 * | 5/2006 | Romesburg et al. | 700/94 |

FOREIGN PATENT DOCUMENTS

| | | |
|---|---|---|
| JP | 57-186867 | 11/1982 |
| JP | 60-65608 | 4/1985 |
| JP | 1-248863 | 10/1989 |
| JP | 2-174355 | 7/1990 |
| JP | 2-177753 | 7/1990 |
| JP | 3-36863 | 2/1991 |
| JP | 6-303319 | 10/1994 |
| JP | 7-162922 | 6/1995 |
| JP | 2005-333334 | 12/2005 |

OTHER PUBLICATIONS

Japanese to English translated PN 57186867 and 60065608.*
Combined Search and Examination Report issued by the British Patent Office on Mar. 23, 2007, for British Application No. GB0624705.0.

* cited by examiner

*Primary Examiner* — Fan Tsang
*Assistant Examiner* — Solomon Bezuayehu
(74) *Attorney, Agent, or Firm* — Finnegan, Henderson, Farabow, Garrett & Dunner, L.L.P.

(57) ABSTRACT

According to one embodiment, a voice mail apparatus is connectable to a telephone exchange, records a voice message sent from a caller telephone terminal in a mail box corresponding to each telephone terminals, and reproduces the voice message in response to a reproduction instruction. The voice mail apparatus stores in a memory an audio file having approximately the same signal level as the voice message. The voice mail apparatus inputs the audio file in a voice processing device when a request for processing the voice message is given from a request source telephone terminal. The voice mail apparatus controls the processing gain such that the signal level output from the voice processing device becomes a prescribed level, while performing muting for the request source telephone terminal. The voice mail apparatus inputs the voice message to the voice processing device after completing controlling of the processing gain.

4 Claims, 3 Drawing Sheets

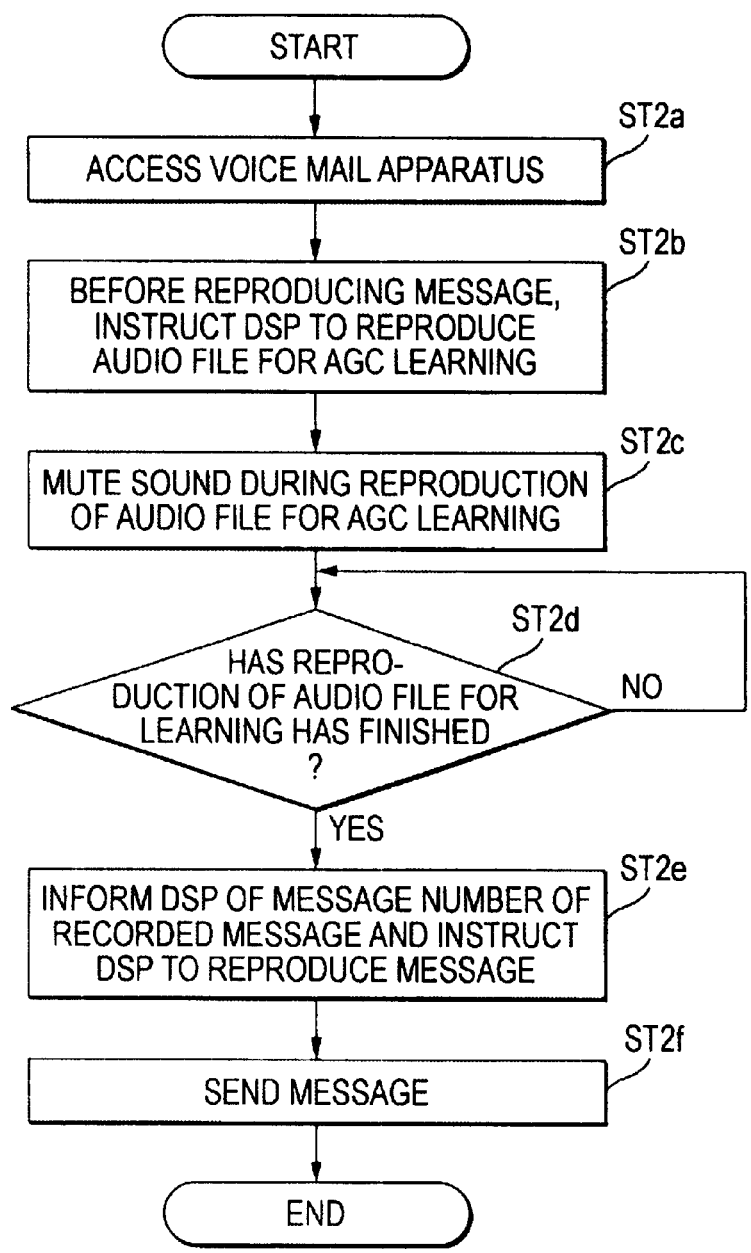

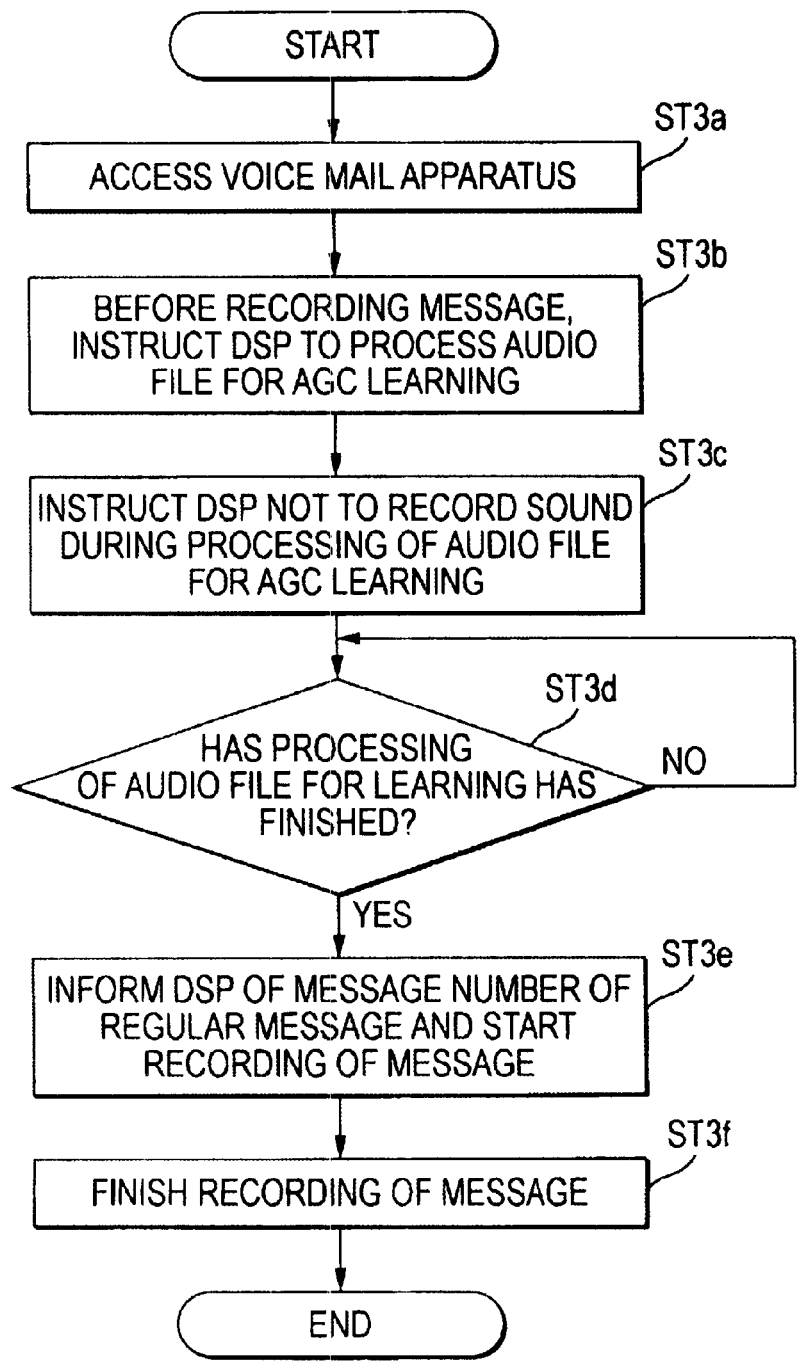

VOICE MAIL APPARATUS AND CONTROL METHOD THEREOF

CROSS-REFERENCE TO RELATED APPLICATIONS

This application is based upon and claims the benefit of priority from Japanese Patent Application No. 2005-368223, filed Dec. 21, 2005, the entire contents of which are incorporated herein by reference.

BACKGROUND

1. Field

One embodiment of the invention relates to a voice mail apparatus which records a voice message from a caller in a certain mail box and reproduces a voice message recorded in a desired mail box, as well as to a control method of such a voice mail apparatus.

2. Description of the Related Art

Conventionally, telephone exchanges such as a PBX (private branch exchange) and a key telephone main unit are used widely in office buildings and business facilities. Those telephone exchanges, to which a voice mail apparatus is connected, have a function of transferring, to the voice mail apparatus, a termination call from an outside line, for example, to an accommodated extension telephone when the extension telephone does not respond to the termination call, because it is busy or there is nobody around it.

Such voice mail apparatus have a function of storing messages from telephones, for example, in plural mail boxes (e.g., JP-A-7-162922).

Incidentally, in the above voice mail apparatus, in reproducing a voice message, first an instruction to reproduce a reproduction message number is sent to and reproduced by a DSP (digital signal processor). A similar procedure is followed also in recording a voice message. As a result, a long time is taken until an AGC (automatic gain controller) becomes stable and hence a message rise level is low. In view of this, a technique for improving the voice quality is strongly desired.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a flowchart of a control process that is executed by a voice mail circuit in reproducing a voice message in the first embodiment; and FIG. 3 is a flowchart of a control process that is executed by the voice mail circuit in recording a voice message in a second embodiment of the invention.

DETAILED DESCRIPTION

Figure 1:
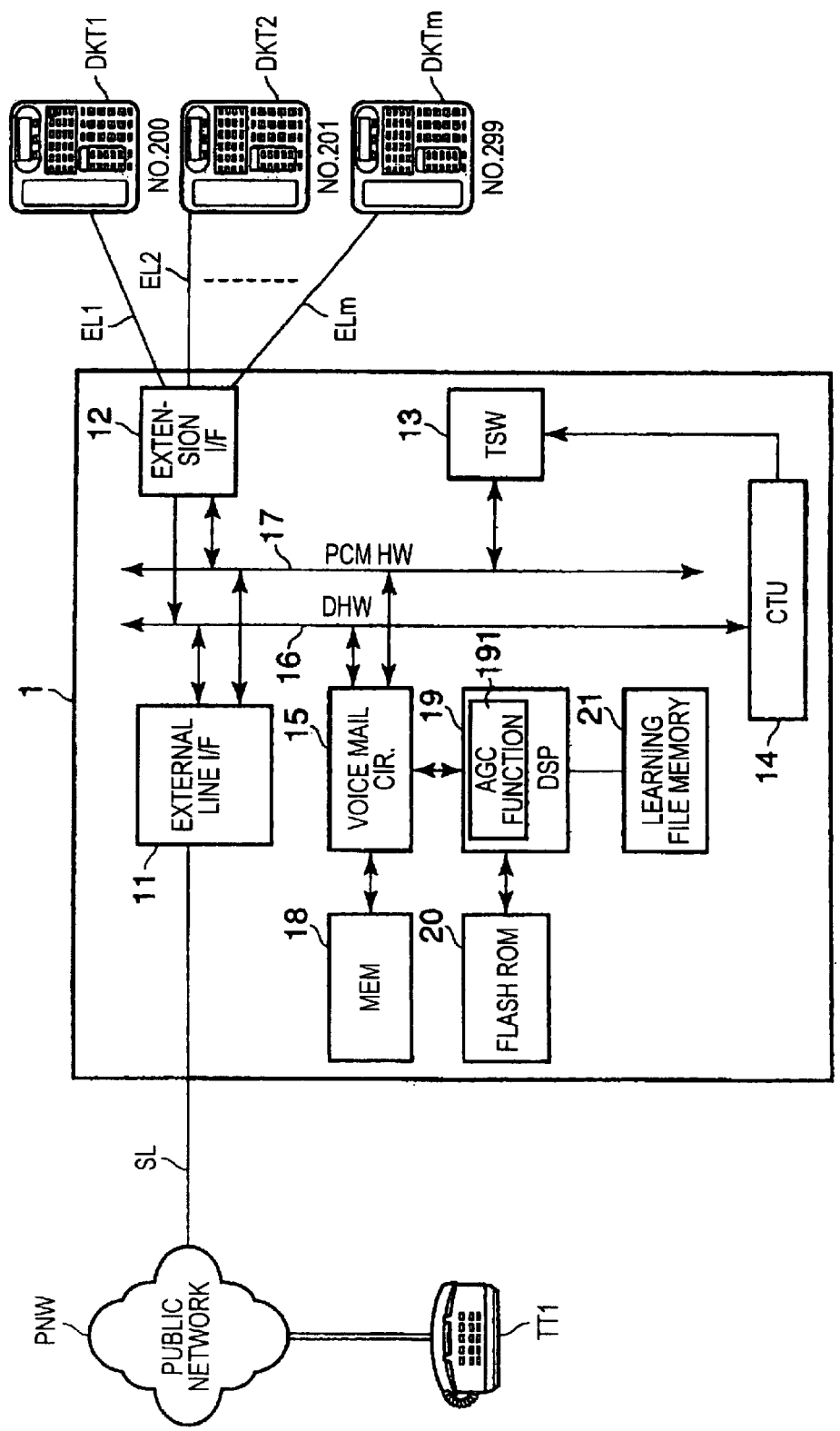
FIG. 1 is a block diagram showing the configuration of an exchange system according to a first embodiment of the invention.

Various embodiments according to the invention will be described hereinafter with reference to the accompanying drawings. In general, according to one embodiment of the invention, a voice mail apparatus includes: a voice mail unit connectable to a telephone exchange for performing switching between a plurality of telephone terminals, the voice mail unit configured to record a voice message sent from a caller telephone terminal in one of different mail boxes corresponding to the respective telephone terminals in response to an incoming call from the telephone exchange, and to reproduce the voice message recorded in one of the mail boxes in response to a reproduction instruction; a storage unit configured to store an audio file for learning, the audio file having approximately the same signal level as the voice message; a processing unit configured to process the voice message with a voice processing device whose processing gain is arbitrarily adjustable; a gain control unit configured to monitor a signal level of an output signal of the voice processing device and to control the processing gain of the voice processing device such that the signal level becomes a prescribed level; and a processing control unit configured to read the audio file for learning from the storage unit to input in the voice processing device when a request for processing the voice message is given from a request source telephone terminal, to perform muting for the request source telephone terminal while the gain control unit is performing a gain control for the audio file for learning, and to input the voice message to the voice processing device after the gain control unit completes the gain control for the audio file for learning.

First Embodiment

FIG. 1 is a block diagram showing the configuration of an exchange system according to a first embodiment of the invention. Reference numeral 1 denotes a main apparatus.

The main apparatus 1 is equipped with an external line interface (I/F) 11, an extension interface (I/F) 12, a time switch (TSW) 13, a central control unit (CTU) 14, and a voice mail circuit 15, among which the external line interface 11, the extension interface 12, the central control unit 14, and the voice mail circuit 15 are connected to each other via a control bus (DHW) 16. The external line interface 11, the extension interface 12, the time switch 13, and the voice mail circuit 15 are connected to each other via an audio bus (PCMHW) 17.

The external line interface 11 is connected to a public network PNW via a subscriber line SL, and performs processing of establishing a call with the public network PNW as well as other processing.

The extension interface 12 accommodates plural extensions EL1-ELm (M: natural number), and extension terminals DKT1-DKTm are connected to the respective extensions EL1-ELm. For example, the extension terminals DKT1-DKTm are digital key telephones. The extension interface 12 performs origination/termination processing, digital signal transfer processing, etc. for the extension terminals DKT1-DKTm.

The time switch 13 performs, according to an instruction from the central control unit 14, channel switching for a digital signal that is transmitted between the external line interface 11, the extension interface 12, and the voice mail circuit 15 via the audio bus 17.

The central control unit 14 has not only ordinary control functions of performing origination processing in response to an origination request from each of the extension terminals DKT1-DKTm, ordinary termination processing in response to arrival of an external line termination call via the subscriber line SL, processing of a transfer between the extension terminals DKT1-DKTm, and other processing, but also a termination call response control function using the voice mail circuit 15. The termination call response control function is to perform the following control upon arrival of an external line termination call. Before ringing up the extension terminal DKT1, for example, as a destination, the central control unit 14 rings up the voice mail circuit 15 and thereby establishes a connection between the voice mail circuit 15 and the external line of the termination call so as to cause the voice mail circuit 15 to send a prescribed announcement message to the subscriber line SL.

The voice mail circuit 15 is connected to a storage section 18 which has mail boxes corresponding to the respective extension terminals DKT1-DKTm. A voice message from a caller is stored in one of the mail boxes.

Incidentally, a DSP 19 is connected to the voice mail circuit 15 of the first embodiment. A flash ROM 20 and a learning file memory 21 are connected to the DSP 19. The voice mail circuit 15, the storage section 18, the DSP 19, the flash ROM 20, and the learning file memory 21 constitute a voice mail apparatus according to the invention. A predetermined voice message such as a "Prompt" message is stored in the flash ROM 20.

An audio file for learning consisting of single sounds and having approximately the same signal level as voice messages is stored in the learning file memory 21. The audio file for learning can be rewritten by an external personal computer.

The DSP 19 has an AGC function 191. Using the AGC function 191, the DSP 19 makes an adjustment so that a voice message that is input from the voice mail circuit 15 comes to have a prescribed signal level.

In reproducing a voice message stored in a certain mail box of the storage section 18, the voice mail circuit 15 causes the DSP 19 to read the audio file for learning from the learning file memory 21 and to perform AGC learning. After the end of the processing on the audio file for learning, the voice mail circuit 15 inputs the voice message to the DSP 19 and causes the DSP 19 to process it. While the audio file for learning is being processed, the voice mail circuit 15 performs muting for the extension terminal DKT1, for example, as a request source.

Next, the operation of the above-configured system will be described.

FIG. 2 is a flowchart of a control process that is executed by the voice mail circuit 15 in reproducing a voice message.

First, assume that the user of the extension terminal DKT1, for example, performs a manipulation of calling the voice mail circuit 15 after booting of the system. In response, the voice mail circuit 15 prompts the user of the extension terminal DKT1 to input a security code. The user of the extension terminal DKT1 inputs a security code and logs in to the voice mail circuit 15.

Also assume that the user of the extension terminal DKT1 then issues an instruction to reproduce a message if any by a DTMF (dual tone multi-frequency) input (dial manipulation). In response, the voice mail circuit 15 moves from step ST2a to step ST2b, where it instructs the DSP 19 to reproduce the audio file for AGC learning.

While the audio file for AGC learning is being reproduced, at step ST2c the voice mail circuit 15 does not send any sound to the extension terminal DKT1 (muting).

When the DSP 19 has completed the processing on the audio file for learning, the voice mail circuit 15 moves from step ST2d to step ST2e, where it informs the DSP 19 of a message number of an actually recorded audio file and instructs the DSP 19 to reproduce the message.

At step ST2f, the voice mail circuit 15 reproduces the voice message from a mail box of the storage section 18, inputs it to the DSP 19, and sends the voice message whose level has been adjusted by the DSP 19 to the extension terminal DKT1.

As described above, in the first embodiment, an audio file for learning is stored in the learning file memory 21 in advance. In reproducing a voice message from a certain mail box of the storage section 18, prior to reproduction of the voice message, the voice mail circuit 15 instructs the DSP 19 to read the audio file for learning from the learning file memory 21. The DSP 19 controls the signal level of the audio file for learning to a prescribed level, and the voice mail circuit 15 performs muting for the request source extension terminal DKT1. When the DSP 19 has completed the processing on the audio file for learning, the voice mail circuit 15 inputs, to the DSP 19, the voice message reproduced from the mail box and causes the DSP 19 to process it while maintaining the processing gain of the DSP 19.

Therefore, the user of the extension terminal DKT1 can hear, in an optimum state, a voice message recorded in a certain mail box of the storage section 18. Furthermore, since a sound of the audio file for learning is muted for the user of the extension terminal DKT1, the user is prevented from feeling a sense of incongruity.

Second Embodiment

FIG. 3 is a flowchart of a control process that is executed by the voice mail circuit 15 in recording a voice message in a second embodiment of the invention.

After booting of the system, the extension terminal DKT2, for example, makes a setting of call forwarding to the voice mail circuit 15 in advance.

Now assume that a termination call directed to the extension terminal DKT2 has arrived from an external telephone TT1 that is connected to the public network PNW. The termination call is detected by the external line interface 11, and detection data are transmitted to the central control unit 14 via the control bus 16. In response, the central control unit 14 performs termination processing for the voice mail circuit 15.

The voice mail circuit 15 moves from step ST3a to step ST3b, where it causes the user of the external telephone TT1 to hear a greeting message of a mail box corresponding to the extension terminal DKT2, thereby prompting the user to have a message recorded. The voice mail circuit 15 establishes a message recording state. Before recording a message, the voice mail circuit 15 instructs the DSP 19 to perform AGC learning using the audio file for AGC learning.

The audio file for AGC learning is not recorded (step ST3c).

After the DSP 19 has completed the AGC learning processing, the voice mail circuit 15 moves from step ST3d to step ST3e, where it instructs the DSP 19 to record a regular message and starts recording.

When the user of the external telephone TT1 has made an on-hook manipulation to finish the sending of the voice message, at step ST3f the voice mail circuit 15 finishes the processing.

As described above, in the second embodiment, in recording a voice message in a certain mail box of the storage section 18, prior to recording of a voice message, the voice mail circuit 15 instructs the DSP 19 to read the audio file for learning from the learning file memory 21. The DSP 19 controls the signal level of the audio file for learning to a prescribed level. And the voice mail circuit 15 sends, to the caller external telephone terminal TT1, guidance information about recording in a mail box corresponding to the termination extension terminal DKT2. When the DSP 19 has completed the processing on the audio file for learning, the voice mail circuit 15 inputs a voice message to the DSP 19 and causes the DSP 19 to process it while maintaining the processing gain of the DSP 19.

Therefore, the user of the external telephone terminal TT1 can record, in an optimum state, a voice message in a certain mail box of the storage section 18. Furthermore, since a sound of the audio file for learning is muted for the user of the external telephone terminal TT1, the user is prevented from feeling a sense of incongruity.

Other Embodiments

The invention is not limited to the above embodiments. For example, although the second embodiment is directed to the case that a termination call arrives from the external telephone terminal TT1, the invention is also applicable to a case that a termination call arrives from any of the extension terminals other than the extension terminal DKT2, that is, the extension terminals DKT1 and DKT3-DKTm.

Although the first embodiment is directed to the case that a message recorded in the storage section 18 is reproduced, the invention is also applicable to a case of reproducing the "Prompt" message which is stored in the flash ROM 20.

Although the above embodiments are directed to the case that the voice mail apparatus is equipped with the mail boxes corresponding to the respective extension terminals DKT1-DKTm, the voice mail apparatus may be equipped with mail boxes corresponding to external telephone terminals in addition to the mail boxes corresponding to the extension terminals DKT1-DKTm.

Although the above embodiments are directed to the case that the voice mail apparatus is incorporated in the main apparatus 1, the voice mail apparatus may be provided outside the main apparatus 1.

Furthermore, various modifications relating to the configuration and type of the system, the configuration of the main apparatus, the type of extension terminals, the voice message recording and reproduction control procedures (including the details of controls), etc. are possible without departing from the spirit and scope of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A voice mail apparatus connected to a telephone exchange for switching between a plurality of telephone terminals, the voice mail apparatus configured to record a voice message sent from a caller telephone terminal in a mail box in response to an incoming call from the telephone exchange, and to reproduce the voice message in response to a reproduction instruction, the apparatus comprising:
    a storage unit configured to store a learning audio file, the learning audio file having substantially the same signal level as the voice message;
    a voice processing unit configured to process the voice message with a voice processing device whose processing gain is arbitrarily adjustable;
    a gain control unit configured to monitor a signal level of an output signal of the voice processing device and to control the processing gain of the voice processing device such that the signal level becomes a prescribed level; and
    a processing control unit configured to read the learning audio file from the storage unit to provide the learning audio file to the voice processing device when a request for processing the voice message is given from the caller telephone terminal, to mute audio for the caller telephone terminal while the gain control unit is performing a gain control for the learning audio file, and to provide the voice message to the voice processing device after the gain control unit completes the gain control for the learning audio file.

2. The voice mail apparatus according to claim 1,
    wherein the processing control unit reads the learning audio file from the storage unit to provide the learning audio file to the voice processing device when a request for reproducing the voice message is given from the caller telephone terminal, and mutes audio for the caller telephone terminal while the gain control unit is performing a gain control for the learning audio file; and
    the processing control unit provides the voice message to the voice processing device after the gain control unit completes the gain control for the learning audio file.

3. The voice mail apparatus according to claim 1,
    wherein the processing control unit reads the learning audio file from the storage unit to provide the learning audio file to the voice processing device when a request for recording the voice message is given from the caller telephone terminal, and sends, to the caller telephone terminal, guidance information about recording in the mail box while the gain control unit is performing a gain control for the learning audio file; and
    the processing control unit provides the voice message to the voice processing device after the gain control unit completes the gain control for the learning audio file.

4. A controlling method of a voice mail apparatus, wherein the voice mail apparatus is connected to a telephone exchange for switching between a plurality of telephone terminals, and the voice mail apparatus is configured to record a voice message sent from a caller telephone terminal in a mail box in response to an incoming call from the telephone exchange, and to reproduce the voice message in response to a reproduction instruction, the method comprising:
    storing a learning audio file in a memory, wherein the audio file has substantially the same signal level as the voice message;
    reading the audio file from the memory and providing the audio file to a voice processing device whose processing gain is arbitrarily adjustable when a request for processing the voice message is given from the caller telephone terminal;
    monitoring a signal level of an output signal of the voice processing device and controlling the processing gain such that the signal level becomes a prescribed level, while muting audio for the caller telephone terminal; and
    providing the voice message to the voice processing device after completing controlling of the processing gain.

* * * * *